Feb. 15, 1955 L. J. FULLER Re. 23,948

MATERIAL TREATING APPARATUS

Original Filed May 15, 1945 6 Sheets-Sheet 1

INVENTOR.
Lawrence J. Fuller
BY
Frank A. Bower
Atty.

MATERIAL TREATING APPARATUS

Original Filed May 15, 1945 6 Sheets-Sheet 2

INVENTOR.
Lawrence J. Fuller
BY
Francis C. Bower
Atty.

MATERIAL TREATING APPARATUS

Original Filed May 15, 1945 6 Sheets-Sheet 3

INVENTOR.
Lawrence J. Fuller
BY
Frank A. Bower
Atty.

MATERIAL TREATING APPARATUS

Original Filed May 15, 1945 6 Sheets-Sheet 4

INVENTOR.
Lawrence J. Fuller
BY
Frank A. Brown
Atty.

MATERIAL TREATING APPARATUS

Original Filed May 15, 1945 6 Sheets-Sheet 5

INVENTOR.
Lawrence J. Fuller
BY
Frank A. Bower
Atty.

MATERIAL TREATING APPARATUS

Original Filed May 15, 1945 6 Sheets-Sheet 6

INVENTOR.
Lawrence J. Fuller
BY
Frank A. Bower
Atty.

United States Patent Office

Re. 23,948
Reissued Feb. 15, 1955

23,948

MATERIAL TREATING APPARATUS

Lawrence J. Fuller, Norristown, Pa., assignor to Welding Engineers, Inc., Norristown, Pa., a corporation of Delaware Original No. 2,615,199, dated October 28, 1952, Serial No. 593,928, May 18, 1945. Application for reissue May 20, 1953, Serial No. 356,329

26 Claims. (Cl. 18—12)

Matter enclosed in heavy brackets [ ] appears in the original patent but forms no part of this reissue specification; matter printed in italics indicates the additions made by reissue.

This invention relates to the treatment of materials and particularly to the working of material by an extrusion type processing.

The object of the invention is to provide a system of treatment subjecting the material to very thorough working under pressure in a manner reaching all parts of the mass and converting the applied energy into heat within the individual particles.

Further objects of the invention particularly in the provision of apparatus for working and delivering the material will appear from the following specification taken in connection with the accompanying drawings in which Fig. 1 is a vertical sectional view of a typical apparatus illustrating the treatment in accordance with this invention, the section *of the casing* being taken on line 1—1 of Fig. 2 *and the worm along line 1–1 of Fig. 2 being shown in full*;

Figures 17, 18, 19, 20:
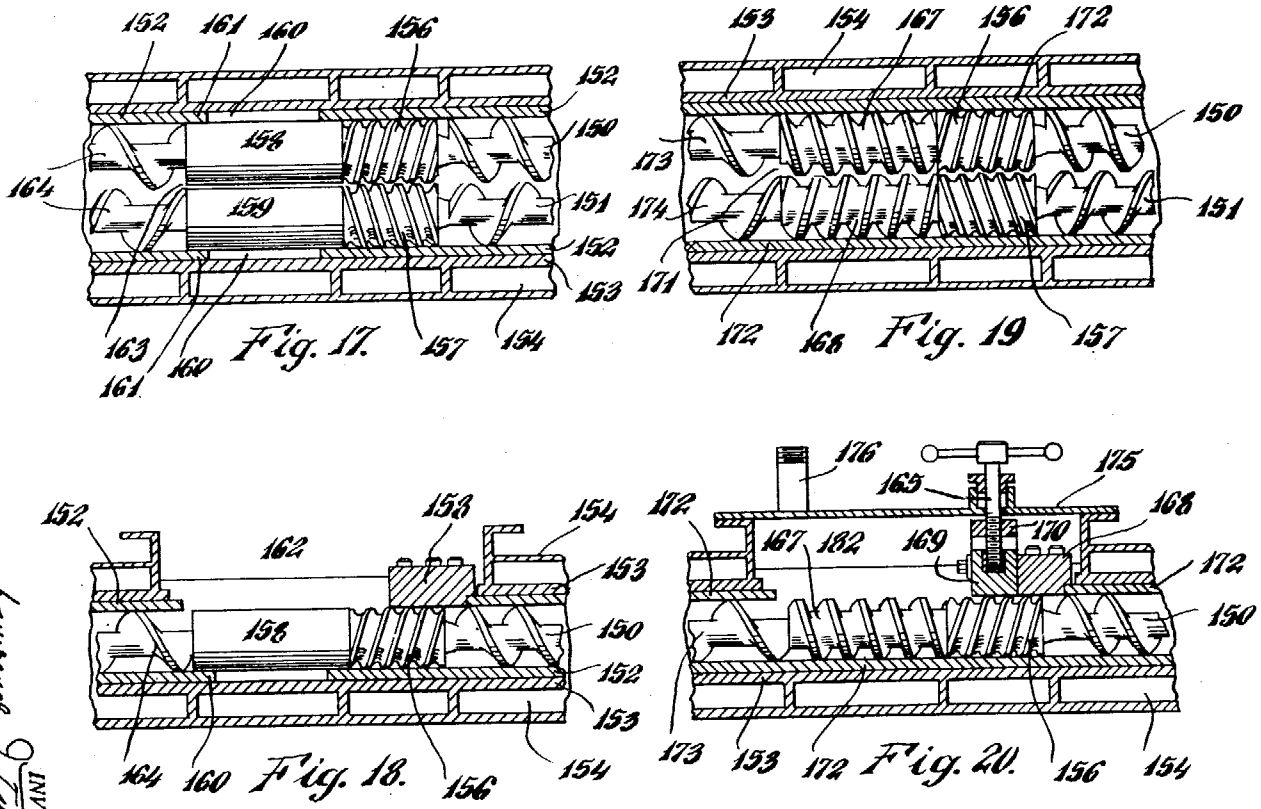

Fig. 17 and 19 are partial sections showing in plan view modified feeding and treating mechanism; and Figs. 18 and 20 are vertical sectional views of the mechanisms of Figs. 17 and 19 respectively.

Figure 2:
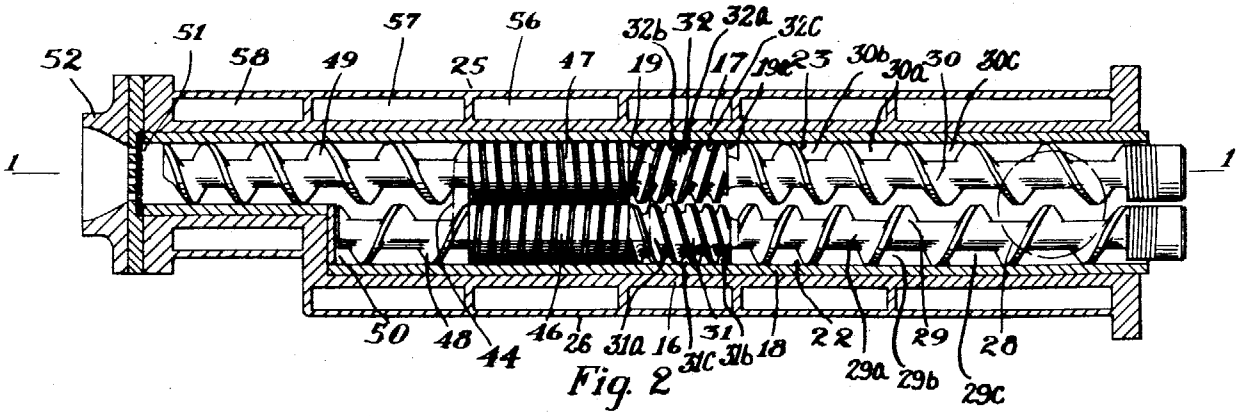
Fig. 2 is a *top* plan view *of the worm* with [parts] *the casing* in section on the line 2—2 of Fig. 1 *along a horizontal plane through the axis of the worms*.
Figure 1:
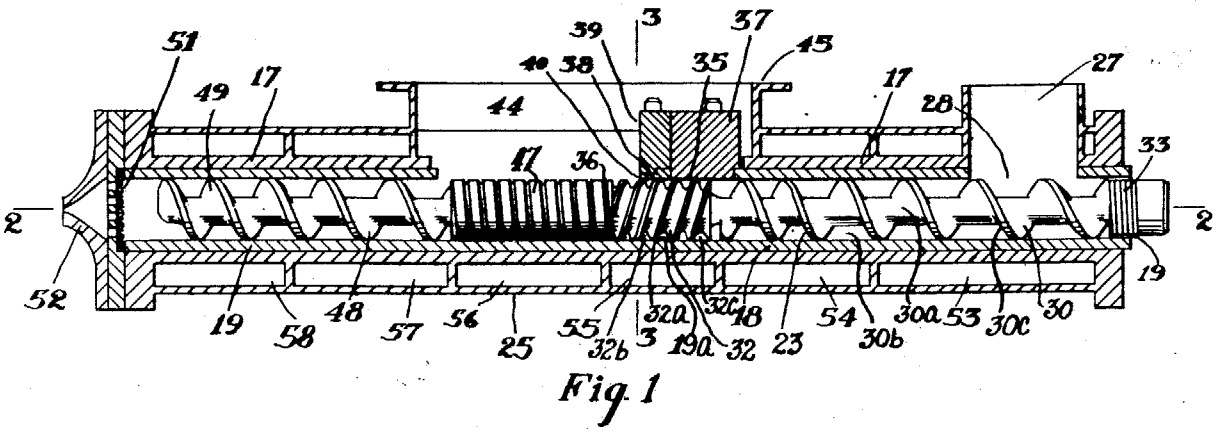
Figure 3:
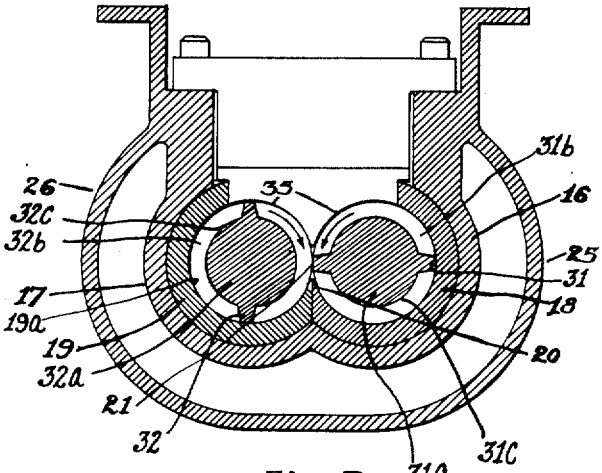
Fig. 3 is a cross section taken on line 3—3 of Fig. 1.

In the apparatus of Figs. 1 to 3 a double barrel 16, 17 is formed preferably of welded plates and is provided with liners 18, 19 meeting at 20 (Fig. 3) and leaving a slot 21 between the barrels. Feed worms 22, 23 with opposite pitches to their flights are positioned in barrels 16, 17 respectively and are connected to be driven with opposite rotations so that their peripheries move downwardly together at the center (Fig. 3).

Surrounding barrels 16, 17 are jackets 25, 26 for heating or cooling fluids, the jackets being divided into sections to control independently the temperatures of successive portions of the worm feed.

A hopper 27 has a bottom opening 28 feeding material down into the receiving ends of the first flights 29, 30 of the feed worms 22, 23. These flights 29, 30 are right and left hand and generally helical in form progressively decreasing in pitch to increase their ability to develop pressure.

Back pressure is developed by the reverse flight screw sections 31, 32 to which the material is delivered by the forward flights 29, 30. The parallel substantially adjacent worms 22, 23 thus carry the material forward and force it into the reverse flights 31, 32 which in turn exert a retarding action on the forward movement of the material. *The stems 31a, 32a of the flights 31, 32 respectively have a larger diameter than the stems 29a, 30a of the main extruder flights 29, 30 so that the cross-sectional area of the spaces 31b, 32b between the surfaces 31c, 32c of the stems 31a, 32a and the adjacent cylinder wall surface 19a and cover surface 35 is substantially smaller than the cross-sectional area of the spaces 29b, 30b between the surfaces 29c, 30c of the stems 29a, 30a and the cylinder walls. This reduction in the space between the walls impedes or retards the forward movement of the material.* The first result of these retarding influences is to squeeze out fluids, if present, which move from the high pressure areas in the reverse flight section (Fig. 1) to lower pressure areas at the right, clearances being provided for this back flow. Liquids are drained off around the screw plugs 33 provided on the worms 22, 23 at the entrances to the barrels, clearances being allowed between the screw plugs and barrel liners for this purpose, and gases pass out through the hopper or other openings.

A further important effect of the action of the forward flights 29, 30 forcing material into and through reverse flights 31, 32 is the generating of heat within the material itself due to the working action of the worms creating internal friction within the material. There is no escape for the material except through the reverse flights so that the back pressure applied to the material and the heat developed by the internal friction simultaneously act on the material as it is being fed, working the material thoroughly under pressure and internally generated heat.

It is thus very completely mixed and conditioned for extrusion and for release of volatiles if any. This heated material plasticized or thoroughly mixed is released by predetermined regulation of the length of the reverse flights in which the material is confined and by providing for release of the material from these reverse flights 31, 32 any desired degree of working and heating may be attained. The escaping material is either exposed to the atmosphere or a chamber suitably supplied with inert gas or partial vacuum.

The regulation of these effects is attained by varying the length of the cover surface 35 confining the material in the reverse flights, longer covers building up more back pressure and causing generation of more heat.

To accomplish this the opening 36 of the barrels 16, 17 is provided with a primary pressure cover 37 removably bolted in place and carrying a replaceable liner 38 held in place by retainer block 39. The under surfaces of the cover block and liner are shaped to fit between the peripheries of the flights (Fig. 3). At this point the material emerges from the confined portions of the reverse flights 31, 32 into an open section of the barrels constituting the release chamber 44 within casing 45.

Through this release chamber 44 the feed is preferably slow, carrying the hot treated material forward by the forward feed flights 46, 47 of worms 22, 23, kneading it and constantly exposing new surfaces for the release of volatiles, and delivering the material to the auxiliary flight 48 and main discharge flight 49 running in the outlet ends of barrels 16, 17. These discharge flights are at much faster pitch and the barrel 16 terminating short at the end wall 50 causes the material of auxiliary flight 48 to transfer laterally over to main extruder flight 49 delivering the material through the screen 51 to the extruder die 52 forming the flow into any desired cross sectional shape, such as a flat ribbon strip.

The open section of the barrels at the relief chamber 44 may be at atmospheric or any desired pressure or partial vacuum, volatile gases being removed according to conditions as provided. Additions of solid or fluid ingredients may be made here or in the hopper 27 for intermixture into the material being handled.

The forcing of the material through the reverse flights 31, 32 subjects the material to a concentrated squeezing and mixing, and simultaneously develops heat within the individual particles. No part of the mass can escape this stage and all parts are treated in identically the same manner and each increment of the feed is brought up to the desired temperature within a very short interval of time amounting usually to a matter of seconds. For instance, with some rubbery material containing moisture, a larger part of which is removed in the first stage by draining back from initial flights 29, 30, the remaining moisture is vaporized off in the relief chamber 44 by the heat developed by the internal friction in the previous stages. This relief vaporization terminates the rise in temperature and may somewhat lower the temperature depending on the amount and type of the volatiles involved and the pressure prevailing in the chamber 44.

The amount of working of the material and the rise in temperature may be regulated by the pitch and length of the reverse flights 31, 32. As shown, these have a relatively steep pitch for slow back feed and for any given reverse flights the treatment of the material may be controlled by varying the effective length of cover surface 35. For instance, the pressure control liner 38 may be replaced by one which is shorter or longer correspondingly reducing or lengthening the reverse feed and similarly reducing or increasing the amount of working and internal friction and generation of heat.

Regulation of the temperature of the barrels at various stages may be accomplished by dividing jacket 25 into sections. For instance, sections 53, 54, 55, 56, 57 and 58 may have their temperatures controlled independently of each other to obtain the most desired results by having the temperature of the barrel higher or lower than or the same as the temperature of the material. The jacket 56 corresponding to the relief chamber 44 will usually maintain heat in the material to aid in the vaporization, and similarly the remaining jackets 57 and 58 will maintain the heated condition of the material for screening and forming by extrusion. These temperatures may be varied as desired to give a very accurate control of the condition of the material throughout the entire processing. The primary pressure cover 37 is removable for access to the reverse feed flights so that these may be inspected and thoroughly cleaned between runs.

The working of the material is widely variable to suit different compositions, and the stages of liquid and gas relief are usually separate and independently controlled. It has been found particularly advantageous to create the high temperature quickly and within the material itself by internal friction following this with a prompt and sharp pressure release. In this way, the interval during which the material is under this high temperature is very short, amounting to only a few seconds in some cases, and the following temperatures are also accurately regulated. The processing may be applied to a wide variety of ingredients for purposes of mixing and/or plasticizing as well as for the extraction of fluids. The material being handled may also be of the thermosetting type utilizing accurate control of heat to thoroughly homogenize the composition and employing heat generated at the reverse flights to initiate a partial chemical reaction causing a delayed thermosetting, conditioning the material for extrusion and subsequent completion of the thermosetting action.

Usually the thermosetting plastics would be introduced into the hopper as a mixture of powder constituents comprising the material to be extruded. The action of the feed worms plasticizes these ingredients and raises the temperature to a desired degree for extrusion under pressure through the forming die. The lapse of time from the heating step to the forming step would be only a matter of less than one minute, and might be of the order of ten to twenty seconds, so that the chemical action taking place during the treatment within the working material would not be sufficient to cause any objectionable or obstructive stiffening, particularly since the temperature of the material is under accurate control and the high heat generated at the reverse flights is only maintained for a very limited duration. As a consequence, the hardening and setting of the plastic would follow the extrusion, and the amount of chemical action within the apparatus is carefully and precisely controlled.

In many cases it would be preferable to pass the extruded material directly from the extruding die to a heated zone to complete the thermosetting action to a desired degree. An example of this would be a thermoplastic material becoming rigid when raised above its polymerization temperature, the material being treated and extruded at a temperature just below this polymerization, after which the elevation of the temperature would complete the setting action. In some polymerizing materials the chemical action takes place over a sufficient period of time so that the initial temperature for plasticizing and extruding will be high enough to bring about the polymerization or thermosetting without additional heating subsequent to extrusion. Some material may be extruded in such form as to be transferred directly to pressing and molding operations for forming and final thermosetting, hardening or curing.

Temporary solvents or chemical agents, such as catalysts, may be added to the original mix as aids in bringing about desired plasticizing or other effects, and then after serving these purposes these plasticizing or other agents may be squeezed out or driven off at the relief chamber 44 beyond the reverse flight or in the double squeeze area, the material being then advanced through the equipment and extruded as desired.

With rubber stocks the apparatus is especially effective in elevating the temperature by rapid mechanical working. The crude unvulcanized stock either has its vulcanizing agent mixed in it or added in the hopper 27. The stock vulcanizing agents and other ingredients are then worked up to temperature and extruded immediately into its desired final form, such as tubing, provision being made, if required, to maintain the formed stock at the proper temperatures to complete the vulcanization operation.

Various modifications of the apparatus will be made to conform to the requirements of particular materials and treatments. The characteristic control of the processing is the development of predetermined temperatures within the material during the rapid mechanical working and extruding operations.

Figure 4:
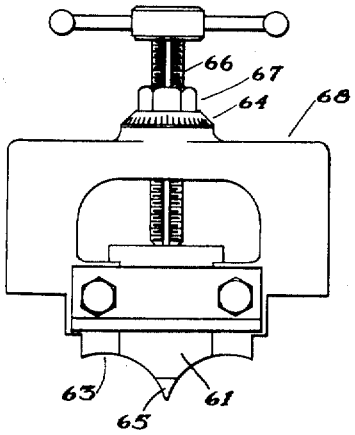
Figs. 4 and 5 are front and side views respectively in elevation of a modified detail.
Figure 5:
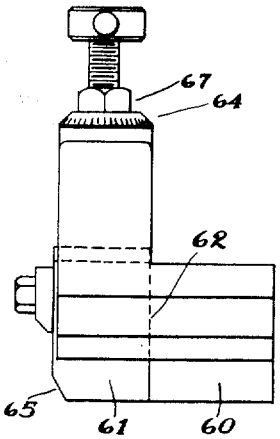

The regulation of the counter flow action and consequent internal frictional effects may be attained by adjustment of a movable section of the barrels over the reverse flights 31, 32. Figs. 4 and 5 show an alternate method of control which can be installed in place of parts 37, 38 and 39 (Fig. 1). The cover block that forms the adjustable section of the barrels may be divided into relatively slidable parts 60, 61 along vertical plane 62. The rear stationary portion 60 is removably bolted in place and carries the adjustable portion 61 having its lower surfaces 63 contoured to fit over the reverse flights 31, 32 with the central portion cut away at 65 on the discharge end. *The lower surfaces 63 forming passageways or spaces 31b, 32b with the surfaces 31c, 32c of the stems 31a, 32a.* Screw bolt 66 attached to adjustable part 61, that can be raised or lowered by turning it, is threaded in bracket 68 and may be locked in position with lock nut 67 so that the effectiveness of the reverse flights may be regulated. The indicating dial 64 for screw 66 may be calibrated in any desired manner to show the various settings of the adjustable block 61 which may be adjusted to various settings during the running of the material through the equipment.

Figure 7:
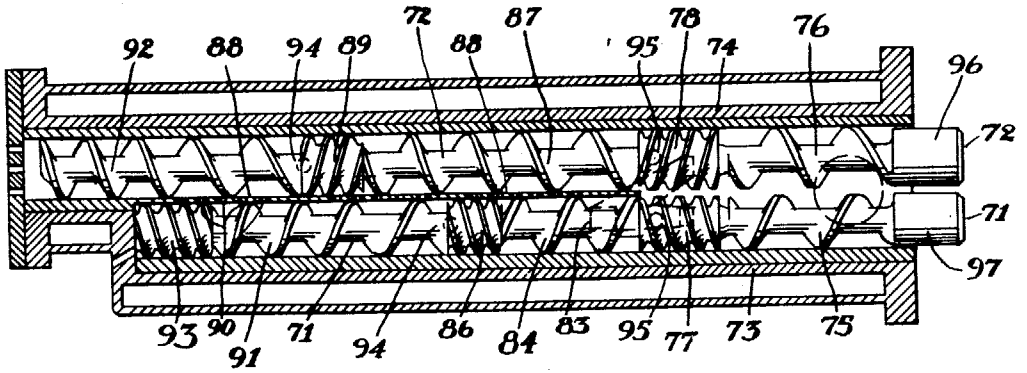
Fig. 7 is a plan view of the apparatus [shown in] *taken along lines 7–7 of* Fig. 6 with top parts removed.
Figure 6:
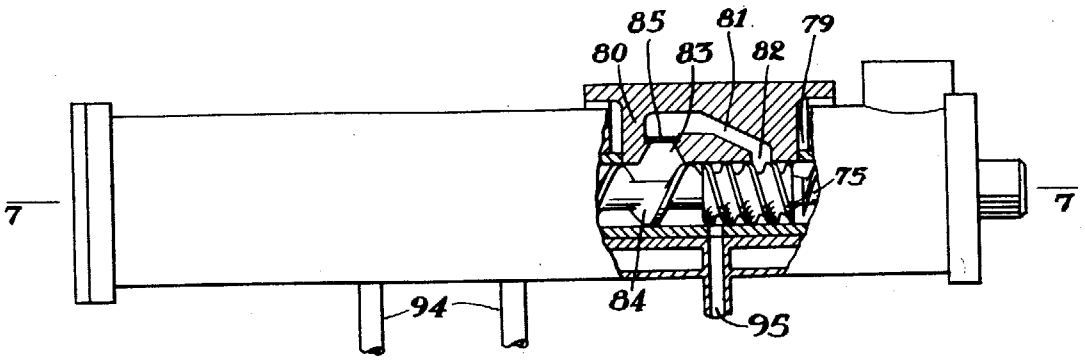
Fig. 6 is a side view, with parts broken away of a modification.
Figure 10:
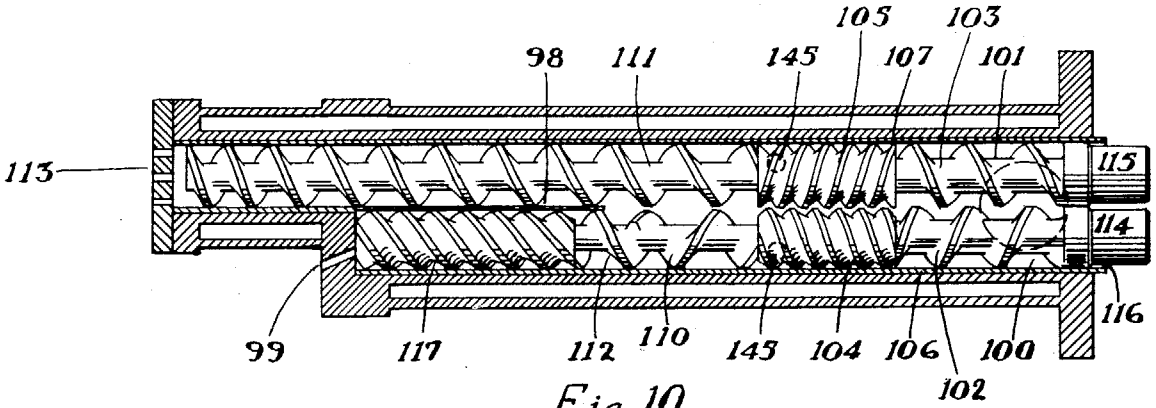
Fig. 10 is a [horizontal sectional view taken on line 10—10 of Fig. 8] *top plan view of the worms shown in the embodiment of Fig. 8 with the casing in section through a horizontal plane through the axis of the worms*.

Various modifications of the system may be resorted to involving special handling of the material. For instance, in Figs. 6 and 7 the worms 71, 72 in jacketed barrels 73, 74 have entrance flights 75, 76 leading to reverse flights 77, 78 over which in space 79 is mounted the adjustable cover block 80 provided with the transfer passage 81 with relief opening 82 at the upper portions of the reverse flights. This passage 81 extends at an angle to the discharge orifice 83 leading to the entrance end of feed flight 84 of worm 71. A screen or die 85 may be interposed across the orifice 83 forming the discharge into separate outflows. The material fed to flight 84 meets the reverse flight 86 and is by-passed to flight 87 of worm 72. A central longitudinal partition 88 intervenes between the flights of worms 71 and 72 at their portions beyond reverse flights 77, 78. This partition may be perforated between flights 84, 86 on one side and flight 87 on the other, and this confines the progress of the material through flights 84 and 86 in series subjecting the material to another pressure and temperature rise due to the opposing actions of these forward and reverse feeds. Or if such further working is not desired, partition 88 may have a slot or openings permitting material to pass laterally from flight 84 and 86 to flight 87. Such material meets with the resistance developed by reverse flight 89 and is by-passed back through orifices 90 in partition 88 to feed flight 91 from which it is again passed back to the other side to flight 92, the counter pressure for this final by-pass being furnished by reverse flight 93.

In this way there are a series of workings of the material back and forth against reverse flight resistance forcing the material through orifices between stages in a manner giving it a very thorough mixing and manipulation. Outlets for relief of fluids may be provided at any desired points on the low pressure sides of the reverse screws as indicated at 94 and 95 and the final extrusion from feed screw 92 may pass the material through screens and dies as desired. At the entrance end the worms 71, 72 are provided with the plugs or hubs 96, 97 retaining the material within the barrels while permitting escape of liquid expressed under action of the opposed flights of the first stages.

In Figs. 8 to 15 the feed worms 100, 101 in barrels 106, 107 have flights 102, 103 at entrance leading to reverse flights 104, 105 provided with either an upper or lower transfer block 108 or 109 having a by-pass leading to the parallel feed flights 110, 111. The material by-passed to flight 110 meets with the resistance of reverse flight 112 and transfers over to the extrusion flight 111. As material passes down flight 111 fluids escape through openings 98 and run out relief opening 99, any material passing through openings 98 is carried back by flight 117 and is passed across to flight 111, discharging the material through die 113. Worms 100, 101 are provided with plug members 114, 115 at the open ends of barrels 106, 107 leaving clearances 116 for backward discharge of liquids.

Figure 13:
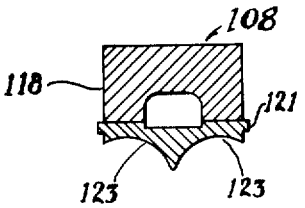
Fig. 13 is a section on line 13—13 of Fig. 11.
Figure 11:
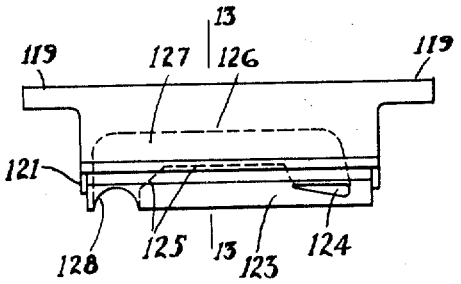
Fig. 11 is a side view of a top transfer block of the apparatus shown in Figs. 8 and 10.
Figure 12:
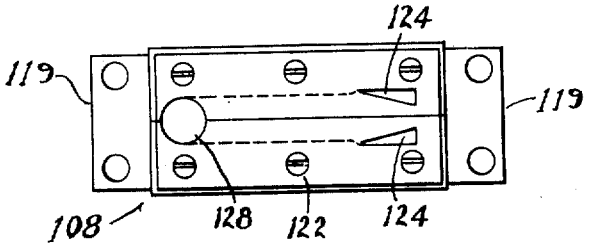
Fig. 12 is a face view of the block shown in Fig. 11.

Upper by-pass block 108 is shown more in detail in Figs. 11, 12 and 13 wherein the cover body block 118 has shoulders 119 resting on blocks 120 (Fig. 8) and cover liner 121 held to the under surface of body 118 by screws 122. The liner 121 has its under surface 123 fitted to the peripheries of the reverse flights 104, 105 and the entrance ends of feed flights 110, 111. At the reverse flight end the liner has entrance orifice 124 of a by-pass 127 formed by passage 125 of the liner in cooperation with passage 126 in the under surface of body 118, this by-pass 127 leading to discharge orifice 128 at the peripheries of the feed flights 110, 111.

Figure 8:
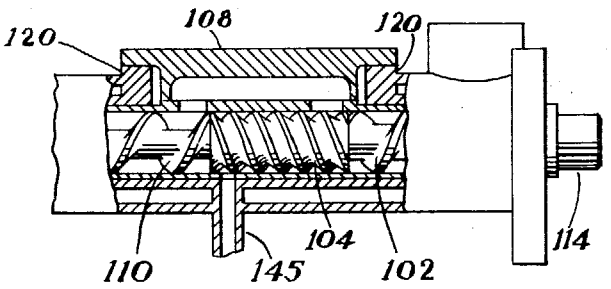
Fig. 8 is a side view, with parts broken away, of a further modification.
Figure 9:
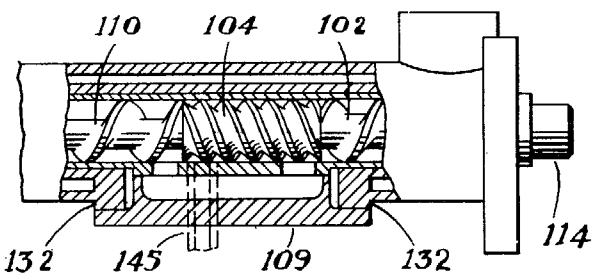
Fig. 9 is a side view, with parts broken away, of a further modification.
Figure 15:
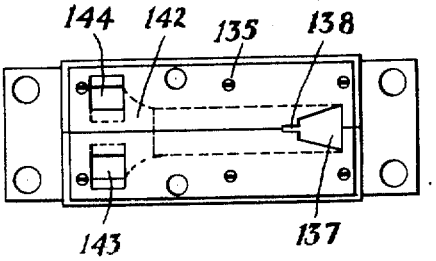
Fig. 15 is a face view of said block.
Figure 16:
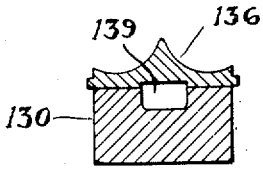
Fig. 16 is a section taken on line 16—16 of Fig. 14.
Figure 14:
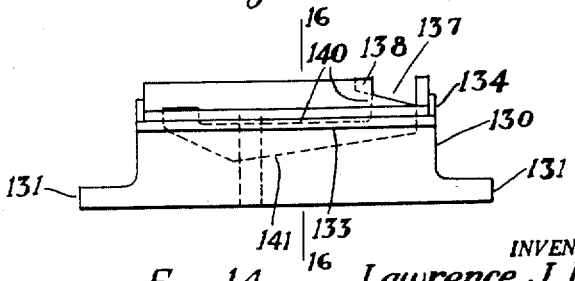
Fig. 14 is a side view of a bottom transfer block of the apparatus shown in Figs. 9 and 10.

The lower by-pass block 109 is shown in Figs. 14, 15 and 16. Here the body block 130 has shoulders 131 for bolting on blocks 132 (Fig. 9) and with the upper surface 133 carrying liner plate 134 fastened by screws 135. The upper surface 136 of plate 134 is shaped to fit the peripheries of the reverse flights 104, 105 and feed flights 110, 111 and orifice 137 and auxiliary orifice 138 lead to by-pass 139 formed by the matching passages 140, 141 in body 130 and plate 134 and branched at 142 in discharge orifices 143, 144 passing the material to the feed flights 110, 111. Fluids released from high pressure areas escape through openings 145 when either top or bottom transfers shown in Figs. 8 and 9 are used.

In Figs. 17 and 18 the feed worms 150, 151 in liner 152 of casing 153 having jacket 154, carry the material to reverse flights 156, 157 under pressure block 158 from which the material discharges out into the release space 162 above cylinders 159. At each end of these cylinders the liner 152 is interrupted to provide spaces 160, the ends of the cylinders overlapping slightly with the liner edges 161 to form bearing surfaces. Rotation of the cylinders 159 carries the material around between them and often the mass being worked will tend to adhere to one cylinder or the other while progressing along toward the discharge 163 under the pressure of the material accumulating behind it. The cylinders 159 thus roll the material into sheet form as it passes through the release space 162 providing extensive exposed surfaces for the escape of volatiles or the absorption of any added ingredients. The material from discharge at 162 is received by the feed flights 164 and passed on to the extrusion opening.

In the modification shown in Figs. 19 and 20 the pressure block 168 carries the vertically movable section adjusted by screw 165 threaded in bracket 170 and swiveled in block 169. In this way by raising or lowering the block section 169 the back pressure may be varied on the material being worked by the forward and reverse flights 150, 151, 156, 157. The worked material is passed into the release chamber 182 above the feed worms 167, 168 in the liners 172 and having the worm flights staggered as shown to grip the material along zig-zag lines and carry it around between them and forward to the discharge 171 into the extrusion worms 173, 174. The cover 175 enclosing the chamber 182 has the outlet 176 for release of volatiles under desired pressure or vacuum.

The flights of the feed screws may have their peripheries staggered as shown or running substantially in contact and the continuity of the helical peripheral portions may be interrupted if desired.

The treatment provided for by processing of this invention is widely adaptable to a variety of materials, and the results obtainable are varied. Materials are mixed, kneaded and worked under pressure releasing mechanically combined fluids. Heat is developed by friction within the material as the result of this working under pressure, the material may be plasticized and volatiles may be distilled off as desired.

The material is then again subjected to pressure for straining and forming into shape. For instance, the process of manufacture of synthetic rubber is carried on in its finishing stages by starting with a slurry of water and soft masses or curds of granules of synthetic material, the water being of the order of 300% on the dry basis for example. The liquids are squeezed from the solids and drained off from the low pressure areas as the solids are advanced to a high pressure area developed by the counter flow action. Heat is developed and the material becomes plasticized due to its intensive working under pressure. Then upon release into a low pressure zone the hot material volatilizes off its moisture content, the resulting product having a moisture content of less than one half of one per cent. The hot dried material is then put under pressure and forced through a strainer and formed into a ribbon or narrow sheet.

Materials with large amounts of entrapped gases and large quantities of volatiles, such as encountered in the finishing operation of polybutene, may be processed in the same manner. High pressures are developed squeezing out the entrapped gas which is tapped off in the low pressure entrance zone where the material is fed in. Heat is developed by intensive working of the material under pressure causing it to become conglomerated. The heated material is then advanced to a low pressure section where volatile substances, such as catalysts, are driven off. The hot treated material is then advanced under pressure developed for straining and forming the mass into ribbons or narrow sheets.

Similarly wire coating thermoplastic compounds, such as those of the Vinylite type, are either fed to the equipment in the form of plasticized chips or tape, or a mixture of filler materials and plastic resin. With the ingredients in the form of powder, the compound is plasticized by the working under heat and pressure. The hot compound is then advanced through the low pressure areas for the release of gases and the driving off of any other volatiles. The conditioned hot compound is then again put under pressure, forced through a straining screen and then extruded as a coating on the wire.

Some materials, such as phonograph record compounds, composed of resins and fillers and in some cases substantially pure resins, are handled by the same procedure. The raw material is introduced in the form of plasticized chips or a mixture of powders composed of fillers and plastic resins. Where powder is used the compound is plasticized by working it under heat and pressure, and it is then advanced through the low pressure area for expulsion of the gases and volatiles and the conditioned hot compound is then extruded or fed directly to the disk forming die and then, preferably while still hot, is fed to the press where the finished record is pressed out on dies containing the recording impressions. The whole process can be accomplished in as little as from one to three minutes except in special cases where extra operations are involved.

Forming of shapes and tubing by this process is attained by feeding, either plasticized or unplasticized, material which is quickly raised in temperature by the working and kneading in the high pressure area and the release of the gases and volatiles in the sudden expansion into the low pressure area. The still hot processed material in the next pressure step may be strained if desired and is formed through a suitable die into predetermined cross sectional shape.

These treatments are typical of the adaptability of the processing to combine a heating, pressing and working of the material under controlled conditions giving a very thorough plasticizing action combined with a dewatering and degasing and a swift development of the heat within the material itself. Then upon release of the hot plasticized material into a region of lower pressure, the volatiles will vaporize off depending upon the conditions maintained in the released chamber. The material may be directly discharged from this release or as shown may be further worked and fed under pressure to straining and extruding apparatus as desired. Also slugs may be formed of this heated and treated material for forming by hot presses injection molding, compression molding, transfer molding and cold molding. The succession of operations on the material has proved not only adaptable but highly efficient in dispensing with separated steps and intermediate handling and has contributed a speed of operation and a control of the time and timing of the heat and pressure hitherto unattainable.

I claim:

1. In apparatus for feeding and treating material, a pair of parallel oppositely rotating worms, each worm having a forward feeding flight and a reduced rate reverse feed flight, barrel casings completely surrounding said forward and reverse flights and retaining said material in said forward and reverse flights under pressure for a predetermined distance through said reverse flights and provided with a release orifice in the casing leading from the feed through said reverse flights to a subsequent area of reduced pressure permitting discharge of said material from said reverse flights into said area only after said predetermined distance of travel of said material through said forward and reverse flights.

2. Apparatus for feeding and treating material as set forth in claim 1 in which the forward and reverse feed flights are interrupted in the continuity of their helical peripheral portions.

3. Apparatus for treating material comprising a plurality of parallel, side-by-side forward feeding rotary members of helical shape cooperating to feed material, a plurality of obstructing rotary members at the discharge ends of said feeding members imposing a counter-action opposite to said forward feed and developing heat and pressure by kneading and working of the material at the area of said counter-action and permitting passing of material under the action of said forward feed so as to determine the rate of feed through all of said members, encasing means surrounding and closely fitting the peripheries of said rotary members to maintain the material under pressure during feeding and a restricted opening in said encasing means positioned to provide discharge means from said obstructing rotary members releasing the material into an area of reduced pressure.

4. Apparatus as set forth in claim 3 in which the discharge area of reduced pressure is provided by a chamber containing mechanism rotatable with said rotary members and working the material under predetermined conditions of heat and pressure.

5. Apparatus as set forth in claim 3 in which the discharge area of reduced pressure contains mechanism rotatable with said rotary members and working the material in surface contact with fluids excluding the atmosphere.

6. Apparatus as set forth in claim 3 in which mechanism rotatable with said rotary members and in the discharge area of reduced pressure works the material to expose additional surface and feeds it forward under pressure to extrude it in desired form.

7. Apparatus as set forth in claim 3 in which the obstructing rotary members comprise reverse helical-screw formations of lower feed rate than said forward feeding members and tending to feed the material in a direction opposite to the forward feed.

8. Apparatus as set forth in claim 3 in which there is a surrounding jacketing in said casing means forming means for controlling the temperature of the surfaces in contact with the material to regulate its temperature during treatment.

9. Apparatus as set forth in claim 3 in which there are outlets at the ends of said rotary members forming discharge means for fluid from the material under pressure in advance of said obstructing rotary members.

10. Apparatus for treating material comprising a pair of parallel acting helically shaped members feeding the material forward, oppositely directed helically shaped members of lower feeding rate opposing the forward feed of said material and permitting passing of material through a predetermined extent of said reverse members under the action of said forward feed, a casing means surrounding and closely fitting the peripheries of said helically shaped members to maintain pressure on the material being treated and an outwardly directed passage from said oppositely directed helically shaped members forming a discharge for said passed material into an area of reduced pressure.

11. Apparatus as set forth in claim 10 in which the forward feeding pair of helically shaped members moves downward toward each other at the center and are supplied from a hopper above both of said members.

12. Apparatus as set forth in claim 10 in which the position of the discharge passage is adjustable lengthwise of the oppositely directed members so that the length of the oppositely directed members opposing the forward feed is variable to regulate the pressure and heat developed.

13. A system for heating material comprising a pair of oppositely threaded and oppositely rotating feed screws subjecting the material to rotary forward feeding from opposite sides, surrounding casing means closely fitting the peripheries of said feed screws to maintain pressure therein, a pair of oppositely threaded, oppositely rotating reverse feed screws of predetermined lower feed rate closely fitted in said surrounding casing means and counteracting said forward feed and thereby working the material under pressure to develop a sudden temperature rise by friction in the material, the heated material being forced a predetermined distance through said reverse feed, and a discharge from said reverse feed releasing the heated material outward from said reverse feed into a space of lower pressure abruptly reduce the pressure on the material.

14. A system for treating material as set forth in claim 13 in which the forward feed screws have peripheral helices running at the same speed and with the edge of one helix offset with respect to the edge of the other in staggered relation and drawing in the material between them.

15. A system for treating material as set forth in claim 13 in which there are parallel rotary members forming feeding means following the discharge into the area of reduced pressure acting to work the material to expose its surface.

16. A system for treating material to reduce its fluid content comprising means for forwardly feeding the material and a subsequent means applying a reverse feed effort on the material, said forward and reverse feed means putting the material under pressure within a surrounding casing to express liquid from said material, a drain from said forward feed for the discharge of said expressed liquid while continuing said forward feed against and through said reverse feed means, and a discharge opening for the material releasing said material from an intermediate point of said reverse feed means into a region of lower pressure and permitting escape of gases from said discharged material in said lower pressure region.

17. A system for heating material as set forth in claim 16 in which there is a pair of parallel forward feed screws receiving the material from the reverse feed, and a casing cooperating with said feed screws to form an extrusion means working the discharged material and extruding it after the extraction of gases therefrom.

18. A system for treating material to reduce its fluid content comprising a pair of forward feed screws and a pair of reverse screws coaxial with said forward feed screws and feeding backward at a lower rate to develop a gradient pressure on the material, a casing surrounding and closely fitting the peripheries of said feed and reverse screws and cooperating therewith in expressing fluids from said material and producing high pressure and low pressure areas, means permitting fluids to flow from the high pressure areas to the lower pressure areas, and discharge means drawing fluids from said low pressure areas.

19. A system for treating material as set forth in claim 18 having the screw feeds parallel and opposed and a casing enclosing them to confine the material to kneading and working in the high pressure area to generate heat by internal friction, and a discharge from said reverse feed into a low pressure area, and means in said low pressure area working said material for the release of volatiles therefrom.

20. A system for treating plastic material comprising parallel acting rotary helices developing pressure on each side while radially retaining said material and constraining the material to forward longitudinal progress, similar parallel acting rotary helices developing pressures reversely directed and exerting a reverse feed action at a lower rate to develop a corresponding counterpressure opposing said forward feed, said forward feed acting to force the material through said reverse helices against said counterpressure and simultaneously raising its temperature, and a discharge orifice for said material releasing it from a predetermined point of said reverse feed so that said material is at a relatively high pressure at said point of release.

21. Apparatus for treating material comprising a plurality of parallel, side-by-side, helical, forward feeding, oppositely rotating rotary members cooperating to feed material, a plurality of obstructing oppositely rotating members at the discharge ends of said feeding members imposing a counterpressure opposite to said forward feed and developing heat and pressure by kneading and working of the material at the area of said counterpressure and permitting passing of material under the action of said forward feed so as to determine the rate of feed through all of said members, encasing means surrounding and enclosing the peripheries of said rotary members to maintain the material under pressure during feeding thereto, outlet means passing the material from said obstructing rotary members into an area of reduced pressure, and forward feeding means receiving said material in said area and passing it under pressure to a second point of discharge.

22. Apparatus for treating material as set forth in claim 21 in which the area of reduced pressure is at a pressure below atmospheric.

23. In apparatus for feeding and treating material a pair of parallel barrel casings side by side forming parallel cylindrical passages with a central longitudinal opening between them, and oppositely rotating feed screws having helical flights of similar opposite pitch, carrying the material through said passages and delivering it in parallel paths therefrom with the peripheral edges of said flights in cylindrical contours coaxial with said passages and substantially tangent at the center of said longitudinal opening, said flights being longitudinally staggered with relation to each other so that the edges of the flights alternate in sequence along said central longitudinal opening in all positions of the feed screws.

*24. An extruder comprising a cylinder having a feed opening at one end for the introduction of material to be extruded from the other end thereof, a feed screw rotatable in said cylinder and adapted when rotated to advance and to condition the material for extrusion, and flow control means between the ends of said screw impeding free flow of material along said cylinder and screw and thereby building up a back pressure on the material in advance of said flow control means, said flow control means comprising opposed surfaces on said screw and in said cylinder defining a passageway therebetween of cross-sectional area less than that between adjacent portions of said screw and cylinder, said feed screw being formed with a rib along its passageway defining surface inducing counterflow of material for intimate mixing and blending of the material prior to and during flow through said flow control means.*

*25. An extruder comprising a cylinder having a feed opening at one end for the introduction of material to be extruded from the other end thereof, a feed screw rotatable in said cylinder and adapted when rotated to advance and to condition the material for extrusion, flow control means in the intermediate portion of said extruder providing a passageway which impedes free flow of material and thereby builds up a back pressure on the material in advance of said flow control means, and means for varying the flow area of such passageway including passageway-defining surfaces relatively movable closer to and further from each other whereby the flow area of such passageway may be varied to predeterminedly impede free flow of material therethrough in accordance with the characteristics of the material being extruded.*

*26. An extruder according to claim 25 characterized further in that vent means are provided in the intermediate portion of said extruder following said flow control means for discharge of volatile ingredients and trapped gas bubbles in the material prior to extrusion of the material from the other end of said cylinder.*

References Cited in the file of this patent or the original patent

UNITED STATES PATENTS

| | | |
|---|---|---|
| 1,156,096 | Price | Oct. 12, 1915 |
| 1,364,549 | Gordon | Jan. 4, 1921 |
| 1,849,291 | Gordon | Mar. 15, 1932 |
| 1,871,416 | Broadfield | Aug. 9, 1932 |
| 1,990,555 | Loomis | Feb. 12, 1935 |
| 2,119,162 | Hartner | May 31, 1938 |
| 2,146,532 | Crane et al. | Feb. 7, 1939 |
| 2,175,054 | Ferngren et al. | Oct. 3, 1939 |
| 2,365,374 | Bailey | Dec. 19, 1944 |
| 2,431,274 | Osborne | Nov. 18, 1947 |